(12) United States Patent
Percival

(10) Patent No.: US 9,556,983 B2
(45) Date of Patent: Jan. 31, 2017

(54) ALIGNMENT DEVICE, AND METHOD OF ALIGNMENT USING AN ALIGNMENT DEVICE

(71) Applicant: BAE SYSTEMS plc, London (GB)

(72) Inventor: Kenneth Percival, Strathclyde (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/419,359

(22) PCT Filed: Aug. 2, 2013

(86) PCT No.: PCT/GB2013/052075
§ 371 (c)(1),
(2) Date: Feb. 3, 2015

(87) PCT Pub. No.: WO2014/020353
PCT Pub. Date: Feb. 6, 2014

(65) Prior Publication Data
US 2015/0211666 A1    Jul. 30, 2015

(30) Foreign Application Priority Data
Aug. 3, 2012 (GB) .................................. 1213805.3

(51) Int. Cl.
*F16L 21/06* (2006.01)
*B23K 37/053* (2006.01)
(Continued)

(52) U.S. Cl.
CPC .......... *F16L 21/065* (2013.01); *B23K 37/0533* (2013.01); *F16L 1/10* (2013.01);
(Continued)

(58) Field of Classification Search
CPC . B23K 37/0533; B23K 37/0538; B25B 5/147; B23Q 3/186; Y10T 29/53978; Y10T 29/53913; Y10T 29/53917; Y10T 29/49895; F16L 1/10
See application file for complete search history.

(56) References Cited

U.S. PATENT DOCUMENTS 2,800,867 A * 7/1957 Smith ................ B23K 37/0533
269/152
2,846,968 A * 8/1958 Tipton ............... B23K 37/0533
228/49.3
(Continued)

FOREIGN PATENT DOCUMENTS

CN    201960313 U    9/2011
EP    0429925 A2    6/1991
(Continued)

OTHER PUBLICATIONS

International Preliminary Report on Patentability received for Patent Application No. PCT/GB2013/052075, mailed on Feb. 12, 2015. 6 pages.
(Continued)

*Primary Examiner* — Essama Omgba
(74) *Attorney, Agent, or Firm* — Finch & Maloney PLLC

(57) ABSTRACT

An alignment device is configured to receive, in a generally aligned configuration, workpieces which are to be joined together. In addition, the device is further configured such that, in use of the device, a joining line between the two workpieces is visible for checking alignment, and such that, in use of the device, each workpiece can be marked at a predetermined distance from the joining line. The device and a method of alignment using the device are particularly suited to the joining of pipes in the construction of marine vessels.

6 Claims, 2 Drawing Sheets

(51) Int. Cl.
*F16L 1/10* (2006.01)
*B23Q 3/18* (2006.01)
*B25B 5/14* (2006.01)

(52) U.S. Cl.
CPC .............. *B23Q 3/186* (2013.01); *B25B 5/147* (2013.01); *F16L 2201/10* (2013.01); *Y10T 29/49895* (2015.01)

(56) References Cited

U.S. PATENT DOCUMENTS

| | | | | |
|---|---|---|---|---|
| 3,016,855 | A * | 1/1962 | Wimmer | B23K 37/0533 228/212 |
| 3,422,519 | A * | 1/1969 | Fehlman | B23K 37/0533 228/44.5 |
| 3,894,326 | A | 7/1975 | Merriman | |
| 3,898,714 | A * | 8/1975 | McFadden | B23K 37/0533 219/161 |
| 3,925,854 | A * | 12/1975 | McFadden | B23K 37/0533 219/161 |
| 3,933,292 | A * | 1/1976 | Martin | B23K 37/0533 228/212 |
| 4,174,996 | A * | 11/1979 | Hunter | B29C 65/20 156/499 |
| 4,356,615 | A * | 11/1982 | Dearman | B23K 37/0533 228/49.3 |
| 4,759,492 | A | 7/1988 | D'Amico | |
| 5,165,160 | A * | 11/1992 | Poncelet | B23K 37/0533 228/49.3 |
| 5,481,793 | A | 1/1996 | McClure | |
| 5,560,091 | A * | 10/1996 | Labit, Jr. | B25B 27/16 269/43 |
| 5,738,386 | A | 4/1998 | Barefoot et al. | |
| 6,039,235 | A | 3/2000 | Prissadachky | |
| 8,266,776 | B2 * | 9/2012 | Dwileski, Jr. | B23K 37/0533 228/212 |
| 8,313,016 | B2 * | 11/2012 | Dagenais | B23K 37/0533 228/44.5 |
| 8,695,198 | B2 * | 4/2014 | Dagenais | B23K 37/0533 228/212 |
| 8,850,679 | B2 * | 10/2014 | Bender | B25B 5/147 269/43 |
| 9,079,271 | B2 * | 7/2015 | Dwileski, Jr. | B23K 37/0533 |
| 2005/0050730 | A1 * | 3/2005 | Marando | B22D 19/045 29/897.2 |
| 2006/0156531 | A1 * | 7/2006 | Dwileski, Jr. | B23K 37/0533 29/464 |
| 2007/0256288 | A1 * | 11/2007 | Vermaat | B23K 37/0531 29/464 |
| 2008/0052892 | A1 * | 3/2008 | Dwileski | B23K 37/0533 29/464 |
| 2008/0115363 | A1 * | 5/2008 | Marando | B22D 19/045 29/897.2 |
| 2008/0256770 | A1 * | 10/2008 | Dwileski | B23K 37/0533 29/281.5 |
| 2008/0263849 | A1 * | 10/2008 | Dwileski | B23K 37/0533 29/464 |
| 2008/0263850 | A1 * | 10/2008 | Dwileski | B23K 37/0533 29/464 |
| 2012/0074205 | A1 * | 3/2012 | Dagenais | B23K 37/0533 228/102 |
| 2012/0174372 | A1 * | 7/2012 | Dagenais | B23K 37/0533 29/428 |
| 2012/0318849 | A1 * | 12/2012 | Dwileski, Jr. | B23K 37/0533 228/44.3 |
| 2013/0067709 | A1 * | 3/2013 | Bender | B25B 5/147 29/272 |
| 2014/0013579 | A1 * | 1/2014 | Dagenais | B23K 37/0533 29/559 |
| 2015/0000091 | A1 * | 1/2015 | Bender | B25B 5/147 29/272 |
| 2015/0174706 | A1 * | 6/2015 | McClure | B23K 37/0533 269/45 |

FOREIGN PATENT DOCUMENTS

| | | |
|---|---|---|
| EP | 2100691 A1 | 9/2009 |
| GB | 2474241 A | 4/2011 |
| JP | 60068196 A | 4/1985 |
| KR | 20090132218 A | 12/2009 |
| WO | 2014020353 A1 | 2/2014 |

OTHER PUBLICATIONS

International Search Report received for Patent Application No. PCT/GB2013/052075, mailed on Jan. 9, 2014. 4 pages.
GB Intellectual Property Office Search Report under Section 17(5) received for GB Patent Application No. 1213805.3, mailed Nov. 22, 2012. 7 pages.

* cited by examiner

ALIGNMENT DEVICE, AND METHOD OF ALIGNMENT USING AN ALIGNMENT DEVICE

The present invention relates to an alignment device and to a method of using the alignment device. More particularly, the invention relates to an alignment device for use in aligning and positioning two pipes before joining them together using a mechanical locking device.

It is known to join pipes in marine applications using mechanical joining devices such as the TeeKay AxiLock device. Such devices provide a seal around the joining line between two pipes that is suitable to withstand the pressures in a variety of applications, whilst avoiding the need for welding. However, when using such mechanical joining devices, it is necessary that the pipes are correctly aligned prior to their joining. In addition, it is preferable to centre the mechanical joining device on the joining line between the two pipes. Lack of proper alignment of either the pipes, or incorrect positioning of the mechanical joining device, can lead to leaks or more serious failures at pipe joints.

The Applicant has encountered problems in using such mechanical joining devices. Such joining devices can be easily mis-aligned, or incorrectly positioned on a joint between pipes, particularly where such joints must be made within a particular amount of time or as part of a larger and more complex manufacturing operation. In these circumstances, even though many joints may be made satisfactorily, it is necessary to inspect an increased proportion of such joints in order to be satisfied that leaks or more serious failures will not occur. Faults resulting from misalignment or incorrect positioning can be readily rectified, but additional inspection requirements of themselves result in inefficiencies. These inefficiencies arise even when no faults are found.

It is an aim of the present invention to provide a device and method to overcome or at least mitigate the above-identified problems, providing an increased level of confidence in joints made between pipes using mechanical joining devices.

In accordance with a first aspect of the invention, there is a provided an alignment device configured to receive, in a generally aligned configuration, workpieces which are to be joined together; the device being further configured such that, in use, a joining line between the two workpieces is visible for checking alignment, and such that, in use, each workpiece can be marked at a predetermined distance from the joining line.

The device may have a first, open configuration, and a second, closed configuration, such that the device can be attached to, and removed from, workpieces in a generally aligned configuration suitable for the joining together thereof.

The device may further comprise locking means operable to lock the device in the closed configuration.

The device may further comprise a shoulder, which shoulder, in the closed position, projects inwardly such that the device is accurately locatable on the workpieces.

The workpieces may be pipes.

The device may be generally cylindrical in the closed configuration.

There may be slots machined in the device to enable one or more of the checking of the alignment of the workpieces and the marking of the workpieces.

In accordance with a second aspect of the invention, there is provided a method of joining together two pipes using a mechanical joining device comprising: moveably locating the mechanical joining device on one of the pipes; bringing the pipes into position for joining together; attaching an alignment device as described above to the pipes at the join between the pipes; checking alignment of the pipes, and if necessary adjusting the position of one or more of the pipes until the correct alignment is achieved; marking the correct position of the mechanical joining device on the pipes, using the alignment device; removing the alignment device from the pipes, and sliding the mechanical joining device to the position marked on the pipes; and fastening the mechanical joining device to join the pipes together.

The above and further features of the invention are set forth with particularity in the appended claims and will be described hereinafter with reference to the accompanying drawing in which:

Figure 1:
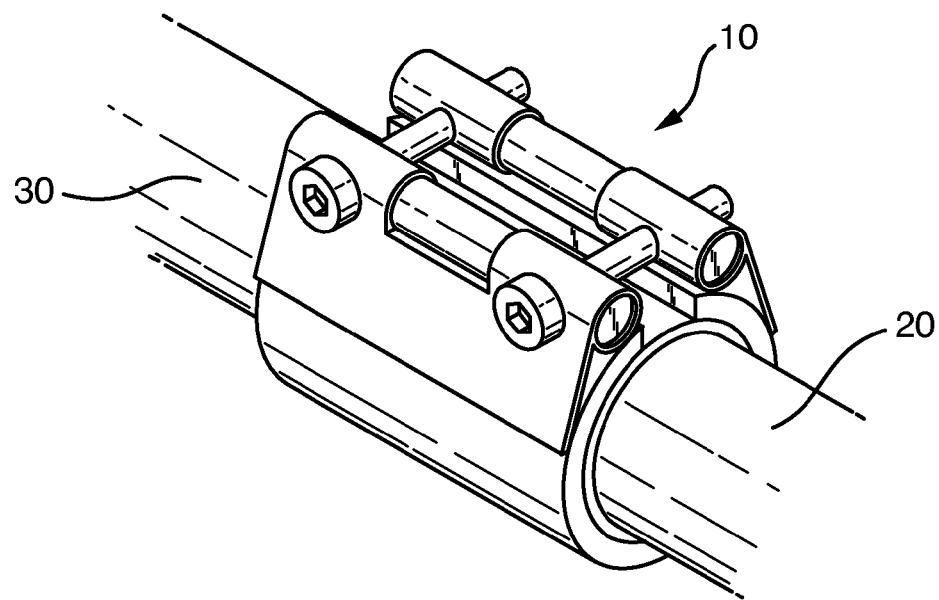
FIG. 1 is schematic drawing of two pipes joined by a Teekay AxiLock device.
Figure 2:
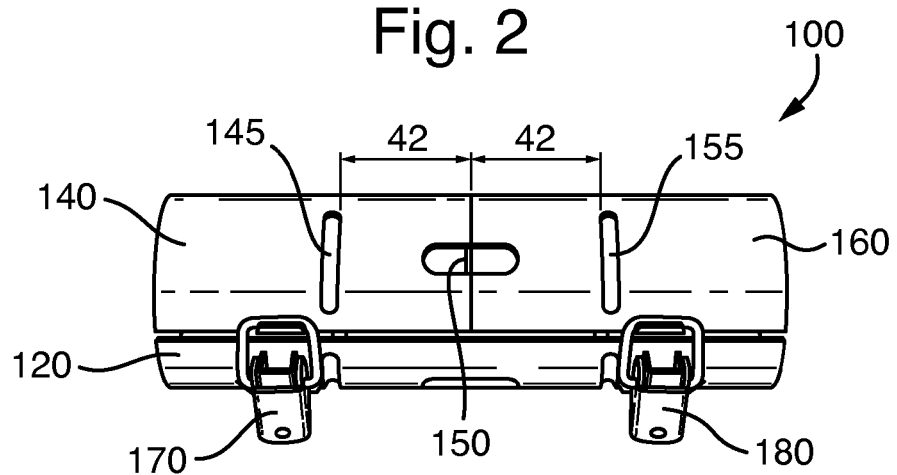
FIG. 2 is a schematic drawing of an alignment device in accordance with a first embodiment of the invention and in a first configuration.
Figure 3:
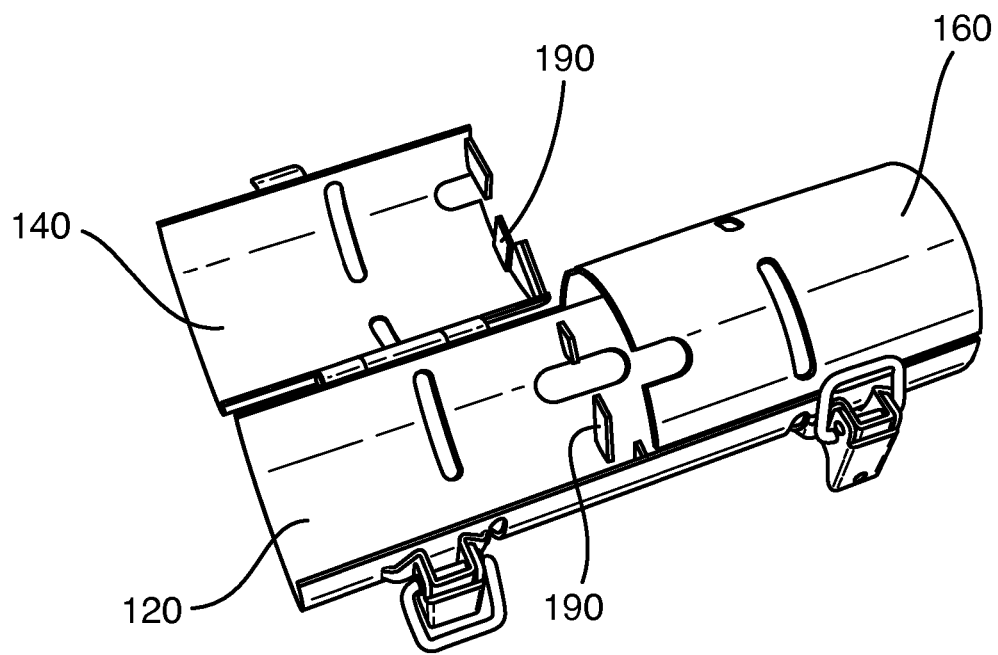

FIG. 3 is a schematic drawing of the alignment device of FIG. 2 in a second configuration; and FIG. 1 is a schematic drawing illustrating the use of a mechanical joining device 10, in the present embodiment a Teekay Axilock device, to join pipe 20 to pipe 30. In order for the pipes to be successfully joined, it is preferable to align the pipes 20, 30 to within approximately 4 degrees for angular alignment, and to within 1% of the outer diameter of the pipes, or 3 mm (whichever is lesser) for parallel alignment. It is also preferable to ensure that the mechanical joining device 10 is centred on the joint between the two pipes 20 and 30. The Applicant has encountered problems in reliably achieving such alignment, and the present invention aims to facilitate reliable alignment of pipes so as to reduce the need for subsequent inspections.

FIG. 2 is an illustration of an alignment device 100 in accordance with a first embodiment of the present invention. The alignment device 100 is shown in a closed configuration. In the closed configuration, the alignment device 100 is generally in the form of a hollow cylinder. In general terms, the alignment device is divided along its length to form a lower portion 120 and an upper portion, the upper and lower portions being approximately equal in size, with the upper portion being further split perpendicularly to the axis to form two sections 140 and 160 of approximately equal length. A number of slot-like windows are defined in the device, with windows 145, 150 and 155 being illustrated in FIG. 2. Windows 145 and 155 are defined generally perpendicularly to the axis of the cylinder, whilst window 150 is defined generally parallel to the axis of the cylinder. In use of the device, windows 145 and 155 enable the correct position of the Axilock device to be marked on pipes to be joined together, whilst window 150 enables the join line between the pipes 20, 30 to be inspected for correct alignment.

The upper portions 140, 160 of the device 100 are connected to lower portion 120 by hinges (not shown in FIG. 2) such that upper portions 140, 160 can pivot to transform device 100 into an open configuration in which device 100 can be attached to or removed from pipes 20, 30. In order to lock the device 100 in the closed configuration illustrated in FIG. 2, clips 170, 180 are provided. Clip 170 enables upper portion 140 to be fastened to lower portion 120, and clip 180 enables upper portion 180 to be fastened to lower portion 120. In the present embodiment, clips 170, 180 are simple toggle latches, such as might be used on a tool-box, although it will be appreciated that many other fastenings may be used, including wing nut fasteners.

FIG. 3 is an illustration of the alignment device 100 in a first open configuration. In the first open configuration, upper portion 140 is pivoted away from lower portion 120, whilst upper portion 160 remains in the same position as in the closed configuration. The opening of upper portion 140 enables a pipe to be located in one half of the device 100. As can be seen in FIG. 3, device 100 includes a number of internally projecting shoulders 190 positioned approximately centrally along the length of the cylinder. Shoulders 190 project from upper portion 160 and from lower portion 120. In the present embodiment, six shoulders are provided, as can be seen from FIG. 3. In use of the device to facilitate correct alignment between two pipes to be joined together, the shoulders 190 ensures that the two pipes are located at the correct separation. In the present embodiment, shoulder 190 is 2 mm thick. It will be appreciated that, in a second open configuration (not illustrated), upper portion 160 is also pivoted away from the lower portion 120.

A method of joining two pipes together in accordance with a further embodiment of the invention will now be described. The method uses the alignment device described above to prepare pipes for joining using a mechanical joining device, such as a Teekay Axilock device, and can be applied to either painted or unpainted pipes.

In a first step, the ends of the pipes to be joined are de-burred, and the ends are further checked for gouge marks or other defects which may affect the performance of the mechanical joining device. If no defects are present, the mechanical joining device is located onto one of the pipes, but not fastened in position, such that it can be slid along the pipe once the pipes have been correctly aligned. The pipes are then brought into approximate alignment, and held in place using clamps or other temporary fixing means. Further adjustments can be made until the pipes are angularly aligned to within 4 deg, and parallel, centre-to-centre alignment is achieved to within 3 mm, or 1% of the pipes outer diameter (whichever is greater). The pipes can then be moved relative to one another such that the distance between the pipe faces to be joined together is as required for the mechanical joining device being used.

The alignment device, described in detail above with reference to FIGS. 1 to 3, is then attached to the pipes. The device 100 is brought up to the pipes in the open configuration, and the shoulder 190 located in the gap between the pipes. The device 100 is then attached to the pipes in the closed configuration (as illustrated in FIG. 2) using the toggle latches 170, 180. The slot 150 is used to inspect the gap between the pipes. Final adjustments to the pipe positions can be made at this stage, if necessary. Vertical slots 145, 155 are then used to mark the pipes. The latches 170, 180 are then opened and the device removed from the pipes. The pipes are then aligned, and in the correct position for joining together.

The mechanical joining device can then be moved into the correct position, by sliding along the pipes to the position as marked on the pipes. The marked lines indicate the position at which the ends of the mechanical joining device should be located. At this point, the join line between the two pipes is positioned approximately centrally in the mechanical coupling device. Further checks are conducted to ensure that the mechanical coupling device is not too close to any bends in either pipe. The mechanical coupling device, in the present embodiment, should not be located at a distance of at least one bend radius away from the start of any bends. The mechanical coupling device is then fastened in position as will be described by the relevant manufacturer's data sheet.

The Applicant has found that use of the device and method described above has resulted in a significant reduction in the number of faults identified in pipes joined using the Teekay Axilock. Previous levels of defective joints identified during inspection led to the rate of inspection of such joints being increased such that all such joints were independently inspected. Use of the device and method described above have reduced such defects to a level at which confidence is achieved with only 20% of completed joints subject to independent inspections. Thus the invention leads to considerable efficiency savings.

Whilst a number of specific embodiments of the invention have been described in the above, it is to be noted that variations and modifications are possible without departing from the scope of the present invention which is defined in the accompanying claims. For example, although it has been described in the above to use hinges for the connection of the upper portions of the device to the lower portion, those skilled in the art will readily appreciate that any mechanical configuration enabling the device to be both attached to and removed from pipes to be joined together may be used. In alternative envisaged embodiments, therefore, the upper portions are entirely removable from the lower portion, and provided with fasters such as toggle latches or wing nut arrangements to attach both sides of the upper portion to the lower portion.

Finally, it should be clearly understood that the terms "upper" and "lower" are used in the above description purely to aid the clarity of the descriptions of the particular embodiment as illustrated.

The invention claimed is:

1. A method of joining together two pipes using a mechanical joining device, the method comprising:
   moveably locating the mechanical joining device on one of the pipes;
   bringing the pipes into position for joining together;
   attaching an alignment device to the pipes at a joint between the pipes, the alignment device configured to receive, in a generally aligned configuration, the two pipes; the alignment device being further configured such that, in use, a joining line between the two pipes is visible for checking alignment, and such that, in use, each pipe can be marked at a predetermined distance from the joining line;
   checking alignment of the pipes, and if necessary adjusting the position of one or more of the pipes until the correct alignment is achieved;
   marking the correct position of the mechanical joining device on the pipes, using the alignment device;
   removing the alignment device from the pipes, and sliding the mechanical joining device to the position marked on the pipes; and
   fastening the mechanical joining device to join the pipes together.

2. The method of claim 1, wherein the alignment device has a first, open configuration, and a second, closed configuration, such that the alignment device can be attached to, and removed from, pipes in a generally aligned configuration suitable for the joining together thereof.

3. The method of claim 2, wherein the alignment device further comprises one or more fasteners operable to lock the device in the closed configuration.

4. The method of claim 2, wherein the alignment device further comprises a shoulder, which shoulder, in the closed position, projects generally inwardly such that the alignment device is accurately locatable on the pipes.

5. The method of claim 2, wherein the alignment device is generally cylindrical in the closed configuration.

6. The method of claim 1, wherein slots are machined in the alignment device to enable one or more of the checking of the alignment of the pipes and marking of the pipes.

\* \* \* \* \*